United States Patent
Ho et al.

(10) Patent No.: US 6,325,468 B1
(45) Date of Patent: Dec. 4, 2001

(54) EBS MODULATOR WITH DIRECT EXHAUST CAPABILITY

(76) Inventors: Thanh Ho, 4149 Shenandoah Pkwy., Brunswick, OH (US) 44212; Robert J. Herbst, 2230 Nagle Rd., Avon, OH (US) 44011

( * ) Notice: Subject to any disclaimer, the term of this patent is extended or adjusted under 35 U.S.C. 154(b) by 0 days.

(21) Appl. No.: 09/165,470

(22) Filed: Oct. 2, 1998

(51) Int. Cl.[7] ........................................ B60T 8/64
(52) U.S. Cl. ................................ 303/118; 137/627.5
(58) Field of Search .................... 303/3.15, 20.7, 303/113.4, 155, 118.1; 137/627.5

(56) References Cited

U.S. PATENT DOCUMENTS 5,123,718 * 6/1992 Tyler ..................................... 303/118
5,673,977 * 10/1997 Camm ....................................... 303/7
5,771,933 * 6/1998 Akamatsu et al. ................. 137/627.5
5,979,503 * 11/1999 Abboud et al. .................... 137/627.5

FOREIGN PATENT DOCUMENTS

3413759 * 10/1985 (DE) ................................ 303/118.1

* cited by examiner

Primary Examiner—Matthew C. Graham

(57) ABSTRACT

A simplified, quick exhaust assembly is provided for a proportional modulator for an electropneumatic braking system. A proportional valve has an enlarged diameter opening that permits direct communication between the delivery port and the exhaust port of the assembly. The opening is dimensioned to be substantially equal to the valve seat area provided by the piston and either meets or exceeds quick exhaust times over present arrangements.

13 Claims, 4 Drawing Sheets

EBS MODULATOR WITH DIRECT EXHAUST CAPABILITY

BACKGROUND OF THE INVENTION

This invention relates to a proportional modulator for controlling air pressure in a braking system and particularly to a modulator of simplified design having direct exhaust capability.

Electropneumatic braking systems (EBS) use a fluid modulator that converts an electrical signal from an electronic control unit into a pneumatic signal that actuates vehicle brakes. A conventional electropneumatic proportional brake for regulating pressure is shown and described in U.S. Pat. No. 5,123,718, the details of which are incorporated herein by reference. An electrical signal is conveyed from a foot pedal and input to an electronic control unit which provides an electrical signal to an armature of a solenoid actuator of the modulator. Energizing the armature controls movement of a piston extending outwardly from the solenoid valve assembly. The piston includes a seal that engages a valve seat formed on a hollow spool valve. Opposite external end surfaces of the spool valve include seal members, such as O-rings, that are sealed relative to the modulator housing in a deactuated position of the spool valve. Thus in the deactuated position, supply pressure from a source of pressurized air is communicated to an inlet port of the modulator and does not reach the brake or delivery port. Instead, the delivery port remains in communication with an exhaust port, i.e., the brakes are in a release position.

A diaphragm includes a pilot passage therethrough which maintains the delivery port in communication with a small diameter exhaust port formed in the modulator housing. More particularly, when deactuated the piston is retracted relative to the solenoid valve. Thus, the piston is disposed in a normally open position. In this manner, the delivery port is in communication through a small diameter passage formed in the hollow spool valve with the small diameter exhaust port.

During a brake application, a pulse width modulated electrical signal is provided to the solenoid armature. This urges the piston to a closed position with the valve seat on the end of the spool valve. The piston also moves the spool valve so that the external seal on the spool valve is opened and supply pressure communicates therethrough to the delivery port. As will be appreciated, the diaphragm is also unseated as a result of the pressure from the supply port. The pressure from the supply port also communicates through a small diameter opening through the spool valve. The pressure, in turn, acts against the piston so that a proportioning action occurs.

When the brake is released and the piston is retracted within the armature, the spool valve engages its seat and pneumatic pressure through the supply port is terminated. The pressure at the delivery port lifts the diaphragm valve so that a quick exhaust may be made through the large diameter exhaust opening in the modulator housing.

The conventional EBS proportional modulator assembly described above is relatively complex and has many components. The diaphragm used as a quick release also adds an undesired differential across the supply and delivery ports. In addition, it is desirable to eliminate the small diameter exhaust port opening through which the brake port normally communicates through the spool valve.

Accordingly, a need exists for a quick release valve of an ABS/EBS module that exhausts a large control volume in a short period of time without adding a differential across the supply and delivery ports. It is desirable that such a valve not be as complex as that known in the art.

SUMMARY OF THE INVENTION

The present invention provides an EBS modulator having a quick exhaust function with a simplified structure that eliminates the complexity and cost associated with prior arrangements.

According to the present invention, a preferred modulator includes a housing having a supply port, delivery port, and an exhaust port communicating with a valve chamber formed in the housing. A valve member received in the housing controls flow between the ports and includes an internal passage dimensioned to provide quick exhaust capability.

According to another aspect of the invention, an actuator is responsive to an electrical signal and cooperates with the valve member for regulating flow between the ports.

A primary advantage of the present invention is found in the simplified structure using a reduced number of valve components.

Another advantage of the invention resides in the reduced size of the valve.

Still another advantage of the invention is provided by the ability to manufacture the simplified modulator structure using standard manufacturing components and techniques.

Yet another advantage is found in a quick release function that eliminates the differential or hysteresis due to an exhaust diaphragm.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
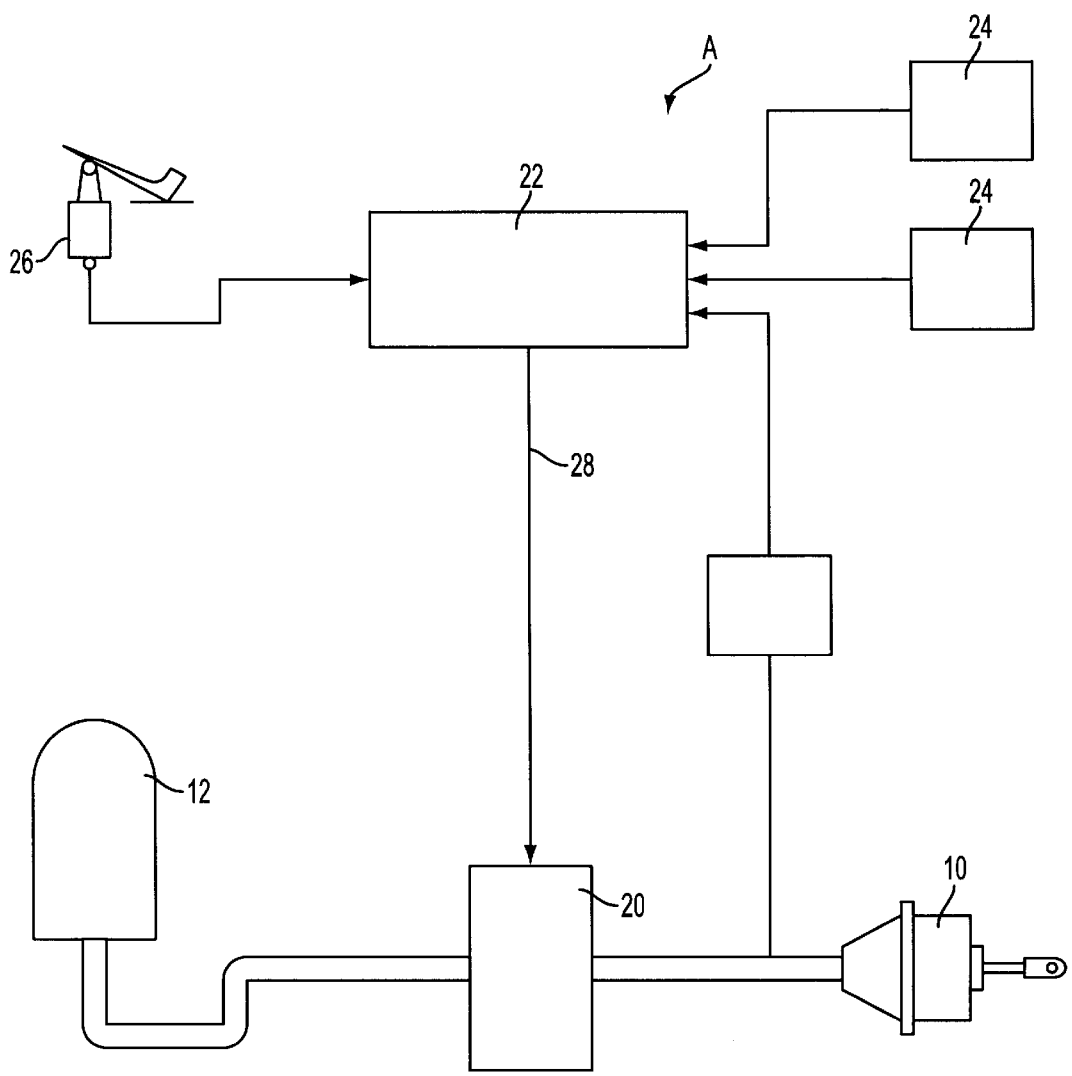
FIG. 1 is a schematic representation of a braking system in accordance with the subject invention.

Referring now to the drawings wherein the showings are for the purposes of illustrating the preferred embodiment of the invention only and not for purposes of limiting same, FIG. 1 schematically illustrates an ABS/EBS braking system in which a brake cylinder 10 applies a braking force to a wheel (not shown). The brake cylinder is in communication with a source of pressurized air 12 through a modulator valve 20. As will be described in greater detail below, the valve 20 is electrically actuated and receives a control signal from an electronic control unit (ECU) 22. The onboard ECU 22 receives various electrical signal inputs from one or more sensors 24 and a signal from a foot pedal 26. The electronic signals are input to the microprocessor and, in response, a suitable control signal is provided through line 28 to the modulator valve 20. The sensors, for example, monitor wheel skid conditions (antilock brake systems or ABS systems) and/or wheel slippage such as a traction control system. The pressure supplied to the brake cylinder may also be monitored and a suitable signal provided to the electronic control unit 22 to prevent overpressure conditions. General details of these types of units are well known in the art so that further description herein is deemed unnecessary to a full and complete understanding of the present invention.

Figure 2:
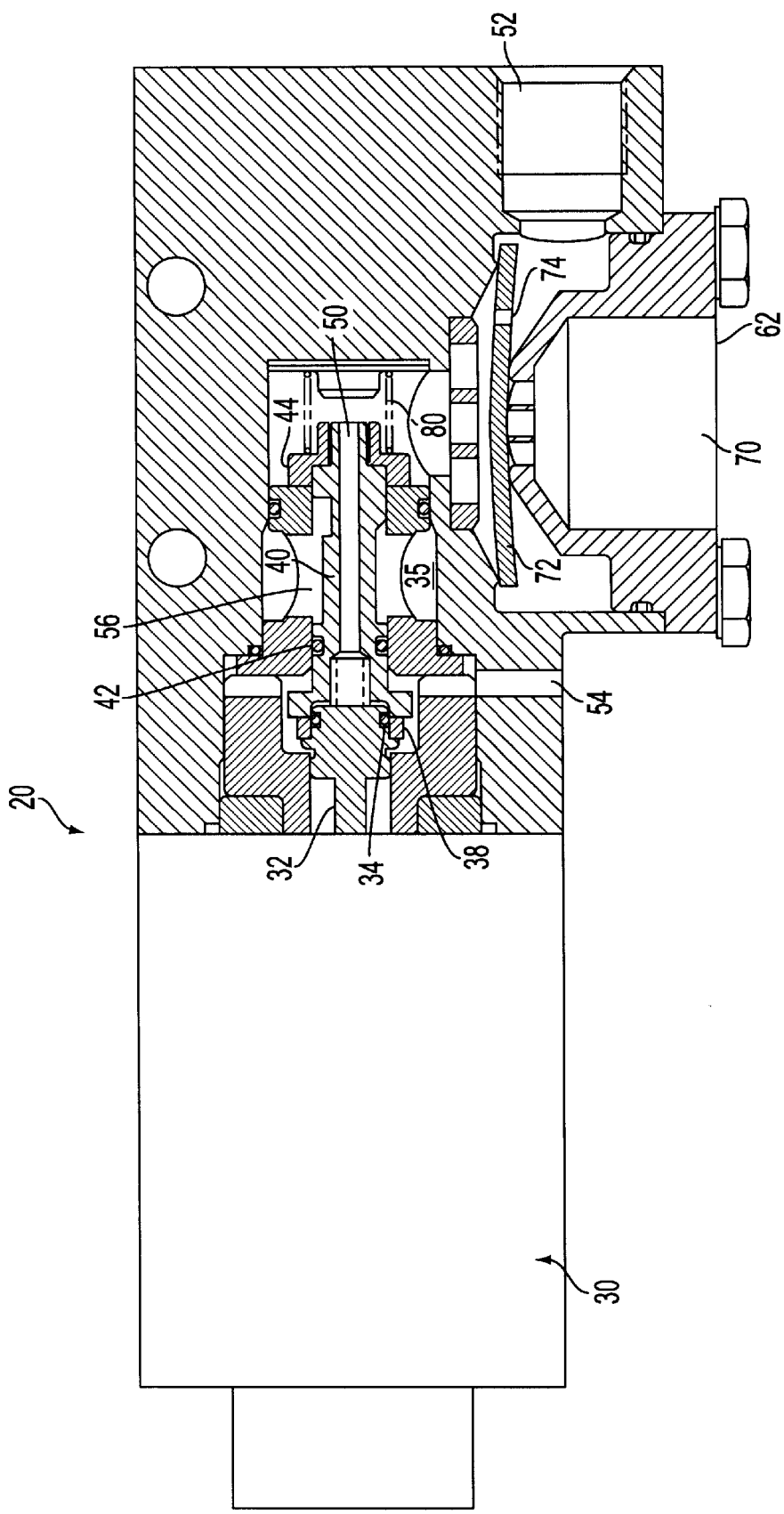
FIG. 2 is an elevational view, partly in cross-section of a conventional solenoid operated, proportional modulator valve.

Turning now to FIG. 2, the prior art configuration generally described in the Background section above is illustrated. More particularly, a modulator 20 includes a solenoid actuator 30 having a piston 32 with an O-ring seal 34 at one end. The piston extends into valve cavity or supply chamber 36 in the modulator housing where the seal selectively engages valve seat 38 on one end of a spool valve 40. The spool valve is a hollow cylindrical arrangement having first and second seals 42, 44 defined at opposite ends thereof. A central, small diameter passage 50 extends through the spool valve and provides communication between a first or delivery port 52 and a small diameter exhaust port 54. In this arrangement, the diameter of the spool passage is on the order of 0.090 inches. In addition, an inlet or supply port 56 selectively communicates with the delivery port 52 for applying a pneumatic braking force to the brake cylinder associated with the wheel (not shown). A second or enlarged diameter exhaust port 70 is also provided and is in selective communication with the delivery port 52 via diaphragm 72. The diaphragm includes a bleed or pilot opening 74 that provides constant communication between the delivery port and the supply chamber 36.

When an operator depresses the foot pedal, an electrical signal is ultimately provided to the armature of the solenoid actuator. This urges the piston 32 rightwardly from its spaced association with the seat 34 (i.e., the valve is normally open) and into engagement with the left-hand end of the spool valve 40. Communication, therefore, between the exhaust port 54 and the delivery port 52 is closed. The spool valve then continues traveling rightwardly where seal member 44 is moved from its sealed position to an open position in which pressurized air from the supply port 56 communicates with the delivery port 52 and pressure increases in the brake cylinder. At the same time, the pressurized air also communicates through the small diameter passage 50 of the spool valve. This pressure counteracts the rightward movement of the piston caused by the energized armature and provides a proportioning action on the piston 32. In this manner, the proper pressure or proportioned pressure is provided to the delivery port 52.

Upon release of the foot pedal, pressure in the chamber 36 urges the piston leftwardly since the armature is no longer energized. This pressure, along with the biasing force provided by spring 80, urges the spool valve leftwardly to close off communication between the supply and delivery ports and opens the exhaust seat 38. In addition, differential pressure across the exhaust diaphragm lifts the diaphragm so that communication is established between delivery port 52 and the quick exhaust port 62. Again, more particular details of this type of valve structure are shown and described in U.S. Pat. No. 5,123,718.

Figure 3:
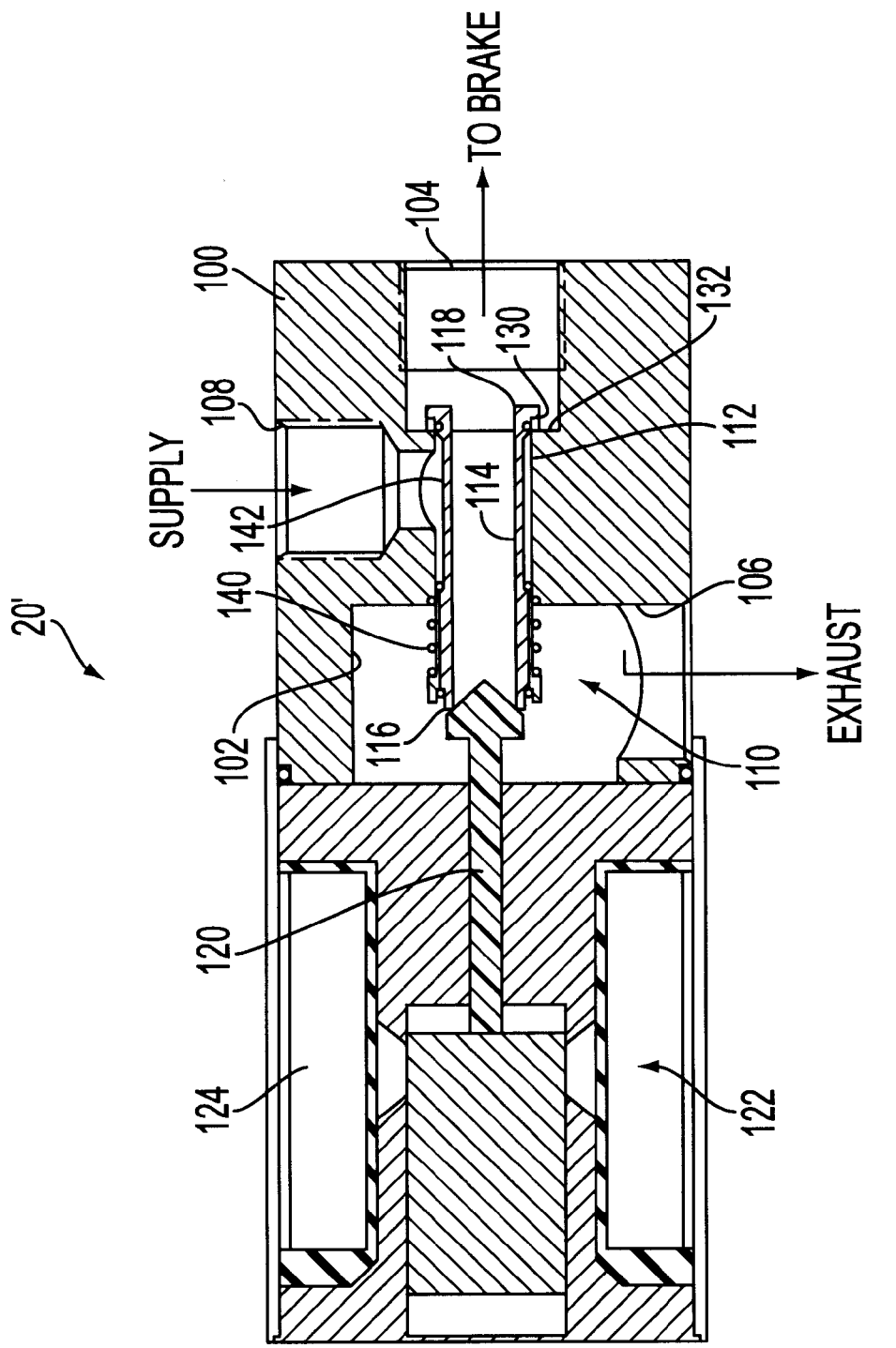
FIG. 3 is a cross-sectional view of a proportional modulator formed in accordance with the subject invention.

Turning now to FIG. 3, a greatly simplified proportional modulator valve 20' is shown. It includes a housing 100 having a cavity or chamber 102. A first or delivery port 104 is in selective communication with a single, second or exhaust port 106 and a third or supply port 108. A valve assembly 110 includes a hollow cylindrical spool valve 112 having a passage 114 that extends from a first end 116 to a second end 118. For purposes of comparison, the passage 114 has a diameter of 0.378 inches—approximately four times the diameter of the spool passage of the prior art. The first end of the spool valve defines a valve seat for piston 120 of solenoid actuator 122.

As described in conjunction with the prior art arrangement of FIG. 2, the solenoid actuator includes a coil 124 that receives a signal from an electronic control unit. Thus when the coil is energized, the piston 120 is urged rightwardly into engagement with the first end 116 of the spool valve. Until that time, the piston is spaced from the first end of the spool valve so that the delivery and exhaust ports 104, 106 are in direct communication through the enlarged diameter passage 114 of the spool valve. Movement of the spool valve rightwardly from the position shown in FIG. 3 allows the seal 130 to move from its valve seat 132 defined in the housing. This establishes communication between the supply pressure port 108 and the delivery port 104. When the supply port is connected to the delivery port, pressurized air also passes through the central opening 114 and against the face of the piston that engages the first end of the spool valve. This pressure urges the piston leftwardly against the energization force of the armature so that a proportioned amount of pressurized air reaches the delivery port.

A biasing member such as spring 140 is interposed between the housing and the first end of the spool valve. As shown, the spring is disposed along an external surface of the spool valve at a region leftwardly of the reduced diameter region 142 that defines the supply pressure passage when the spool valve is moved off of the seat 132. The enlarged diameter passage 114 through the spool valve provides not only a direct exhaust, but a quick exhaust for communication between ports 104, 106. As will be appreciated, the opening has a diameter just less than the seat area 116 defined at the first end of the spool member. This arrangement allows a number of components to be eliminated from the current design shown in FIG. 2. For example, the diaphragm and quick exhaust port 62 of FIG. 2 are entirely eliminated. Moreover, the spool valve is a simpler structure and the stationary sleeve used in the current design in which the spool valve reciprocates is also eliminated.

Most importantly, a major distinction is the relative sizes of the openings through the spool valves. As will be appreciated, it is this diameter that controls the quick exhaust function since the spool valve passage provides an open communication path between the delivery and exhaust ports. The small diameter exhaust port 54 in the arrangement of FIG. 2 is also eliminated. Instead, a single exhaust port 106 is provided in the embodiment of FIG. 3. This allows the exhaust port 106 to be sized so as not to restrict the exhaust function and thus provides a quick acting response when braking action is released and the delivery and exhaust ports are in open communication upon retraction of the piston.

Figure 4A:
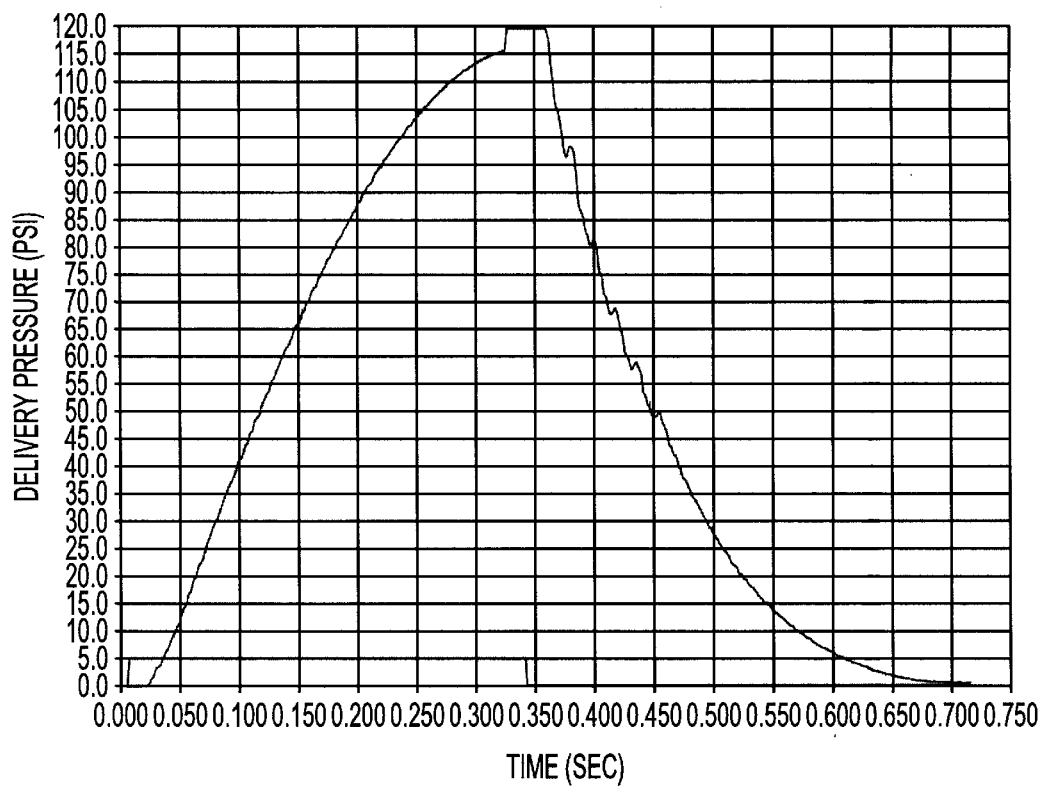
FIG. 4 is a graphical representation of the quick exhaust function of the proportional modulator.
Figure 4B:
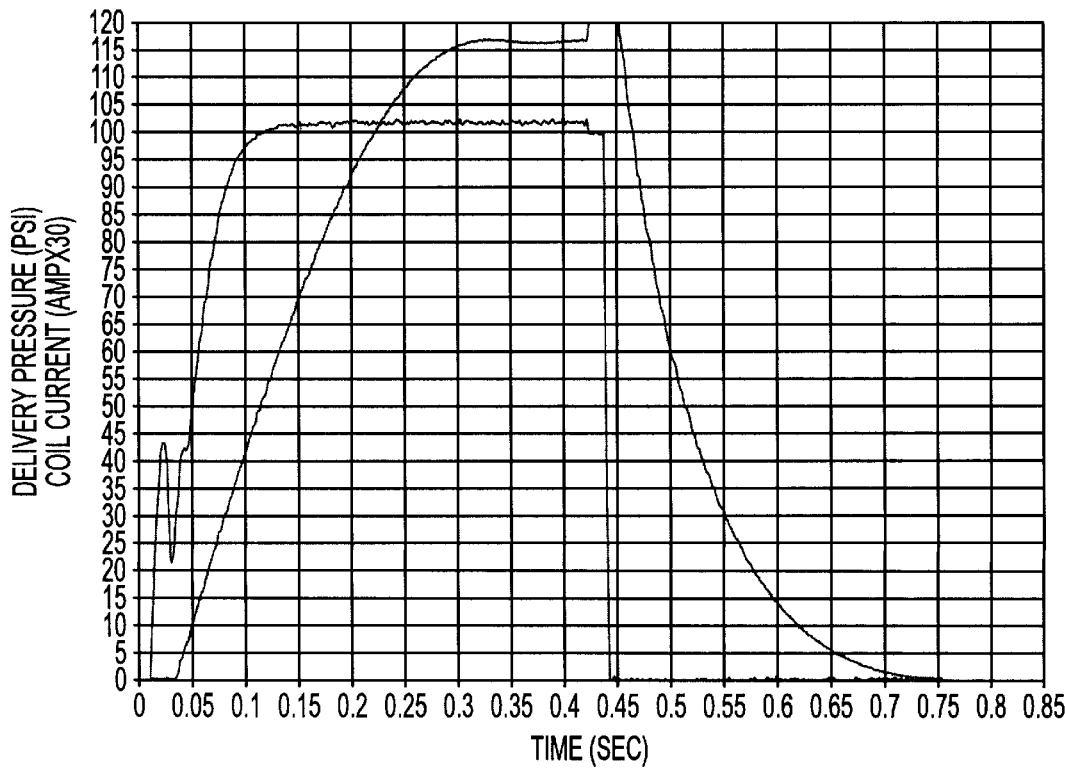

In addition, the design of FIG. 3 still provides a quick exhaust. By quick exhaust is meant the time in which pressure decreases, for example, from 95 psi to 5 psi. Measured test results are graphically illustrated in FIG. 4 and exhibit a quick exhaust on the order of 0.23 seconds for the current design. The simplified design of FIG. 3 meets or exceeds the exhaust time of the current design at a measured quick exhaust time of 0.186 seconds.

The invention has been described with reference to the preferred embodiment. It is understood, however, that a number of other changes could be made to the preferred arrangement without departing from the scope and intent of the subject invention. For example, alternative electrical actuators could be used instead of the solenoid actuator. Likewise, alternative seal arrangements could be used such as a ball seal or elastomeric poppet as opposed to the O-ring type designs. However, such adaptations and variations of the valve would be apparent to one skilled in the art and still fall within the scope of the invention as defined in the accompanying claims.

Having thus described the invention, it is claimed:

1. A modulator comprising:
   a housing having a first port adapted for connection with a source of supply pressure, a second port adapted for connection with a brake chamber, and a third port adapted for connection with ambient;
   a hollow spool valve received in the housing and movable relative thereto for selectively connecting the first port to the second port and an internal passage through the spool valve for selectively connecting the second port to the third port, the internal passage being the only exaust path between the second and third ports;
   a biasing member interposed between the housing and spool valve for urging the spool valve to a first position that prevents communication between the first and second ports;
   an actuator operatively associated with the spool valve for urging it to a second position that establishes communication between the first and second ports; and
   a valve member defined on the actuator for selectively engaging the spool valve, thereby closing communication between the second and third ports and establishing communication between the first and second ports.

2. The modulator of claim 1 wherein the third port is the only exhaust port of the modulator.

3. The modulator of claim 1 wherein the internal passage has a dimension on the order of approximately 0.40 inches.

4. The modulator of claim 1 wherein movement of the actuator is controlled by an armature that receives a signal from an electronic control unit.

5. The modulator of claim 1 wherein the spool valve includes a seal that engages a valve seat interposed between the first and second ports.

6. The modulator of claim 5 wherein the spool valve includes a valve seat formed thereon that cooperates with the actuator for selectively closing communication between the second and third ports.

7. An electropneumatic braking system modulator comprising:
   a housing having a valve chamber defined therein;
   a supply port formed in the housing communicating with the valve chamber and an associated supply of pressurized air;
   a delivery port formed in the housing communicating with the valve chamber and an associated brake chamber;
   a single exhaust port formed in the housing communicating with the valve chamber and ambient;
   a valve member disposed in the valve chamber for controlling communication among the supply, delivery, and exhaust ports; and
   an internal passage through the valve member dimensioned to provide quick exhaust capability between the delivery and exhaust ports.

8. The modulator of claim 7 further comprising an actuator having a portion extending into the valve chamber for selectively engaging the valve member and opening communication between the supply and delivery ports.

9. The modulator of claim 8 wherein the actuator includes an armature responsive to an electrical signal for moving the actuator into engagement with the valve member.

10. The modulator of claim 7 further comprising a spring interposed between the housing and the valve member for urging the valve member toward a position preventing communication between the supply and delivery ports.

11. The modulator of claim 7 wherein the internal passage has a dimension on the order of 0.40 inches.

12. The modulator of claim 7 wherein the internal passage through the valve member is the only exhaust path between the delivery port and the exhaust port.

13. The modulator of claim 7 wherein the internal passage through the valve member has a dimension on the order of approximately 0.40 inches.

* * * * *